United States Patent [19]

Ireland

[11] 4,267,208
[45] May 12, 1981

[54] COATING OF OPTICAL LENS FOR BLOCKING PURPOSES

[76] Inventor: Jack W. Ireland, 664 Merriman Rd., Akron, Ohio 44303

[21] Appl. No.: 61,949

[22] Filed: Jul. 30, 1979

[51] Int. Cl.³ .................... B65B 33/00; B05D 5/00; B05D 3/12; B32B 3/02
[52] U.S. Cl. ........................ 427/154; 51/216 LP; 51/277; 51/284 R; 427/155; 427/164; 427/240; 428/64; 428/157; 428/192
[58] Field of Search ............... 428/192, 157, 64, 542; 427/240, 154, 155, 162, 164, 165, 207.1; 51/277, 284 R, 216 LP

[56] References Cited

U.S. PATENT DOCUMENTS

| | | | |
|---|---|---|---|
| 2,224,168 | 12/1940 | Tillyer et al. | 260/745 |
| 2,352,616 | 7/1944 | Canning | 51/216 LP |
| 3,355,342 | 11/1967 | Lanman | 156/295 |
| 3,404,488 | 10/1968 | Cox et al. | 51/284 |
| 3,962,833 | 6/1976 | Johnson | 51/284 |
| 3,994,101 | 11/1976 | Coburn et al. | 51/216 LP |
| 4,111,698 | 9/1978 | Sato | 427/240 |
| 4,113,492 | 9/1978 | Sato et al. | 427/240 |
| 4,158,273 | 6/1979 | Olsen et al. | 51/216 LP |

*Primary Examiner*—William R. Dixon, Jr.
*Attorney, Agent, or Firm*—Maky, Renner, Otto & Boisselle

[57] ABSTRACT

Coating of the convex side of an optical lens for blocking purposes by dipping the downwardly facing convex side in a liquid coating material in a can, upwardly withdrawing the lens above the level of the coating material but below the lip of the can, and spinning the lens about its vertically disposed axis to spread the coating material by centrifugal force as a uniformly thin film over the convex side, to create an edge buildup of coating material to form a thickened bead-like peripheral or rim portion at the periphery of the convex side, and to spin-off excess coating material against the inside of the can for reuse. Upon spin-off of excess coating material the lens is withdrawn out of the can whereupon the film on the spinning lens dries sufficiently for handling within a few seconds time. The spinning operation is then discontinued and the lens may be positioned on a horizontal support with its coated convex side facing upwardly preparatory to blocking.

To facilitate the lens coating operation, the lens is held on its concave side by a suction cup having the upper end of its vibration damping stem chucked in the drive shaft of a hand-held motor. To further facilitate the lens coating operation, a releasable vacuum source is operatively associated with the suction cup to pick up a lens for dipping and spinning and to release the suction cup from the lens without handling of the lens.

8 Claims, 6 Drawing Figures

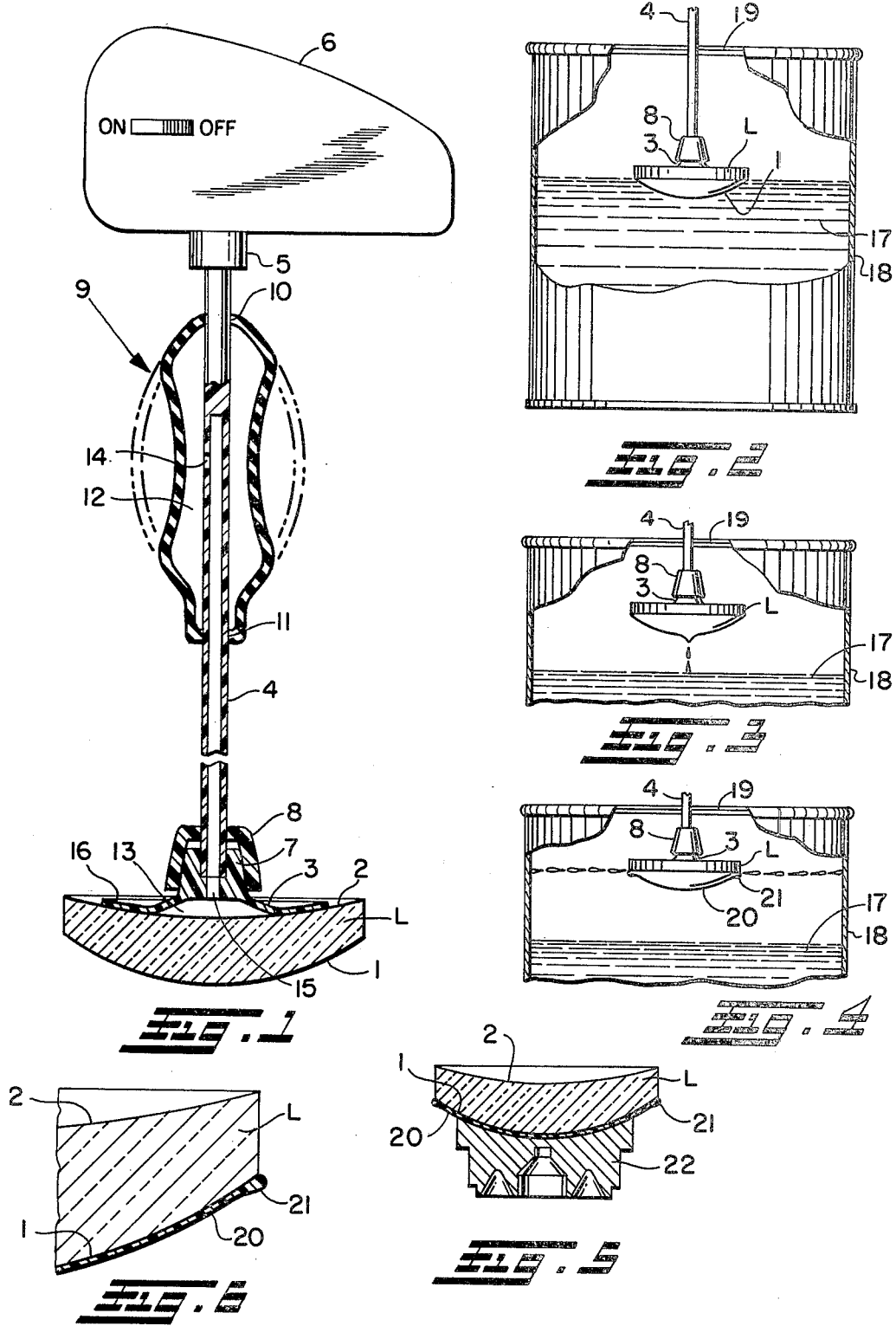

COATING OF OPTICAL LENS FOR BLOCKING PURPOSES

BACKGROUND OF THE INVENTION

In the coating of the convex side of an optical lens for blocking purposes the prevalent practice is to position the lens on a horizontal support with its convex side facing upward and either brushing or spraying the liquid coating material on the convex side. The brushing operation is more time consuming than spraying and is apt to leave brush marks and a film of uneven thickness whereby after the lens has been deblocked the peeling of the film from the convex side of the lens is difficult and often occurs in pieces and strips at the weak valleys of brush marks or thinner portions of the film. On the other hand, the spraying operation usually is done with an aerosol type spray which, owing to the high percentage of thinner and to overspray or scatter-loss, substantially increases the cost of the delivered film. In addition, the application of a sprayed film whether of the aerosol type or conventional type requires special skill in order to obtain the requisite uniform film thickness free of pinholes, sags, and runs. Aside from the above-mentioned disadvantages and other well known disadvantages of brushing and spraying techniques, the drying time of the brushed or sprayed film may be substantial, i.e. 10 to 15 minutes and if a substantial number of lenses are being coated by spraying, ventilating and overspray catching equipment may be required.

As is well known in the art the coated lens is blocked by casting a low melting point fusible alloy against the coated convex side of the lens, the blocked lens being mounted on the spindle of a machine for grinding and polishing of the uncoated concave side of the blocked lens. Deblocking may be effected as by mechanical jarring of the blocked lens or by "picking off" the blocking alloy from the coated side of the lens.

Examples of other known methods of blocking and deblocking of optical lenses are disclosed in the following U.S. Patents:

Tillyer et al. U.S. Pat. No. 2,224,168, date Dec. 10, 1940
Canning U.S. Pat. No. 2,352,616, dated July 4, 1944
Lanman U.S. Pat. No. 3,355,342, dated Nov. 28, 1967
Cox et al. U.S. Pat. No. 3,404,488, dated Oct. 8, 1968
Olsen et al. U.S. Pat. No. 4,158,273, dated June 19, 1979

SUMMARY OF THE INVENTION

A method of coating an optical lens for blocking purposes which produces a smooth substantially uniform thickness film on the convex side of an optical lens to seal and protect the convex side from blocking materials and grinding and polishing materials during the grinding and polishing operations on the concave side of blocked lens; and to form a secure bond between the lens and the blocking material while simplifying deblocking. The coating method herein produces a film coating which has a thickened bead-like peripheral or rim portion at the periphery of the convex side of the lens to facilitate peeling of the film as a continuous one piece film after deblocking as by mechanical jarring of the blocked lens or by "picking off" the blocking alloy from the coated side of the lens.

The method herein is characterized in that the lens is held on its concave side by a suction cup which has its elongated laterally flexible stem chucked in a hand-held motor by which the lens is manipulated to dip its convex side in the coating material in a can, by which the lens is withdrawn out of the coating material while yet below the lip of the can, and by which the lens is rotated about its axis to spread out the coating material by centrifugal force as a uniform thickness film having a thickened bead-like peripheral portion, excess coating material being spun off against the inside of the can for reuse. The lens is then withdrawn completely out of the can whereby it can be inverted and placed on a rack for drying of the film or the rotation may be continued to effect quick drying of the film in a matter of a few seconds.

In the present invention it is not required that the stem of the suction cup be precisely coaxial with the lens axis because the elongated laterally flexible stem dampens vibrations so that even an eccentrically disposed heavy lens will not be thrown off the suction cup during the spinning operation.

The present invention is concerned additionally with an optical lens having a uniform smooth film thereon, the film including a thickened bead-like peripheral portion to facilitate peeling of the film in one piece after deblocking.

Aside from the use of a simple suction cup, a releasable vacuum source such as a flexible bulb or a flexible vacuum line from a vacuum pump operatively associated with the suction cup facilitates picking up of the lens for dip-spin coating and releasing of the coated lens in inverted position on a drying rack without handling of the lens.

BRIEF DESCRIPTION OF THE DRAWINGS

FIG. 1 is a central longitudinal cross-section showing an optical lens held by a motor-driven suction cup for performing the present dip-spin coating method of the convex side of the lens.

FIG. 2 is a fragmentary elevation view of the step of the present method in which the convex side of an optical lens held by a suction cup on its concave side is dipped into liquid coating material in a can.

FIG. 3 is a fragmentary view similar to FIG. 1 except showing the lens withdrawn above the level of the coating material but below the lip of the can.

FIG. 4 is a fragmentary view similar to FIG. 3 except showing, upon spinning of the lens about its vertically disposed axis, the spreading out of the coating material over the convex side of the lens and the spinning off of excess coating material against the inside wall of the can for reuse.

FIG. 5 illustrates a typical blocked lens.

FIG. 6 is a much enlarged fragmentary radial cross-section view of a lens having a film coating as produced by the present method.

DETAILED DESCRIPTION OF A PREFERRED EMBODIMENT

By way of illustrative example, the optical lens L has a convex side 1 which is to be coated for blocking purposes and a concave side 2 which is to be ground and polished when the blocked lens (FIG. 5) is mounted on the spindle of a grinding and polishing machine.

For performing the coating operation, the lens L is held by a flexible plastic or like suction cup 3 on its concave side 2, the elongated laterally flexible stem 4 of the suction cup 3 being chucked in the drive shaft 5 of a suitable hand-held motor 6 such as a self-contained battery operated motor. As will be seen, a simple suction cup 3-stem 4 construction as just described is entirely adequate to perform the present coating method but does require handling of the lens L to effect firm pressure of the suction cup 3 against the concave side 2 to hold the lens L for coating and to effect peeling of the suction cup 3 from the concave side 2 after the convex side 1 has been coated by dipping and spinning.

In the suction cup 3-stem 4 construction as shown in FIG. 1, the lower end of the stem 4 is a snug fit in the socket of the central boss 7 of the suction cup 3 and is retained by a wedge cap 8. The stem 4 is tubular and has snugly fitted thereover a flexible bulb 9 of rubber-like material which forms a vacuum seal at 10 and 11, the interior space 12 being communicated with the interior space 13 in the suction cup 3 by way of the hollow stem 4 and the passages 14 and 15 in the stem 4 and suction cup 3. When it is desired to pick up a lens L for coating, the bulb 9 is squeezed and the rim 16 of the suction cup 3 is lightly engaged with the concave side 2 of the lens L whereupon release of the bulb 9 will establish a partial vacuum in the spaces 13 and 12 to firmly hold the lens L. When it is desired to release the lens L from the suction cup 3, the bulb 9 is squeezed further to increase the pressure in the spaces 12 and 13 from negative pressure to atmospheric pressure or to a slight positive pressure.

When the lens L held on its concave side 2 by the suction cup 3, the present method of coating the convex side 1 of the lens L for blocking purposes comprises:

1. Dipping the downwardly facing convex side 1 as shown in FIG. 2 in a liquid coating material 17 contained in a can 18, the coating material preferably comprising a vinyl copolymer containing a suitable volatile solvent;

2. Withdrawing the lens L upwardly a slight distance above the level of the coating material 17 but below the lip 19 of the can 18 as shown in FIG. 3, to drain an initial excess of coating material 17 adhering to the convex side 1 of the lens L;

3. Energizing the motor 6 to spin the lens L about its vertical axis as shown in FIG. 4 to spread the coating material by centrifugal force as a uniformly thin film 20 over the convex side 1 of the lens L, to create an edge build-up of coating material to form a thickened bead-like peripheral or rim portion 21 at the periphery of the convex side 1, and to spin-off excess coating material against the inside of the can 18 for reuse;

4. Withdrawing the spinning lens L completely out of the can 18 and inverting the lens L and removing it from the suction cup 3 for drying, or continuing the spinning thereof for a few seconds until the film 20 of coating material has dried sufficiently for handling.

When the lens L is inverted as above described, it may be positioned over a notched rack (not shown) and released thereon by squeezing the bulb 9 to release the suction cup 3 from the downwardly facing concave side 2 of the lens L.

The coated lens L is then blocked in well known matter as shown in FIG. 5 by casting a low melting point fusible alloy 22 against the coated side of the lens L. Prior to casting of the fusible alloy 22 against the coated side of the lens L, the coating 20 may be marked with ink of contrasting color for orienting the lens L with respect to the alloy casting mold (not shown). The blocked lens L (FIG. 5) is securely and accurately held for performance of precision grinding and finishing operations on the concave side 2. The fusible alloy 22 may have a melting point of from about 117° F. to about 158° F. and may comprise for example Quinary eutectic alloy, Lipowitz alloy, or Wood's metal.

The film 20 of coating material on the convex side 1 of the lens L seals and protects the convex side 1 from grinding and polishing materials when the concave side is finished and protects the convex side from heat, scratching or marring during blocking or during handling of the blocked lens L. The blocking alloy 22 adheres to the coating 20 and the coating 20 adheres to the convex side 1 of the lens L to securely and accurately hold the blocked lens L but yet the blocking alloy 22 may be separated from the coating 20 by mechanical jarring or by "picking off" as previously mentioned. Similarly the adherence of the coating 20 on the convex side 1 of the lens L is such that it may be peeled off. The coating material 17 is preferably a transparent colored (often blue) vinyl copolymer in a suitable solvent and may be applied as it comes in the can 18 without thinning except for periodic thinning during prolonged periods of use in coating a plurality of lenses L. This coating material 17 may be characterized as being a relatively heavy-bodied material which, when a lens L is dipped therein and spun, forms a smooth uniformly thin pinhole-free and tough coating 20 over the convex side 1 of the lens L with a bead-like peripheral portion 21. The thickness of the coating 20 depends, not only on the properties of the coating material 17, but also on the RPM of spinning and the time of spinning i.e. the number of revolutions. Generally, the preferred thickness of the coating 20 is in the 0.001" to 0.003" range for glass lenses L and up to about 0.005" (two-coat application) for plastic lenses L.

The stem 4 may be of nylon or like plastic tubing and has a large length to diameter ratio to render the same laterally flexible to effectively dampen vibrations or oscillations in the event the lens L axis is eccentric with respect to the suction cup 3 and stem 4 whereby even a heavy lens will not be shaken loose from the suction cup 3. Likewise, transmission of vibrations to the drive motor 6 are effectively dampened to render more comfortable the holding of the motor 6 in the hand during the lens spinning operation. By way of example, a 1⅜ inch diameter suction cup 3 may be provided with a stem 4 of from about 5 to 8 inches long and of 3/16 inch diameter.

After the concave side 2 of the lens L has been ground and polished, the blocked lens L is removed from the grinding and polishing machine and then, as by mechanical jarring or "picking off", the blocking alloy 22 is separated from the coated side of the lens L and by reason of the uniform smooth film 20 and the thickened peripheral bead-like portion 21, the film 20 may be easily peeled off the lens L in a single piece as contrasted with brushed or sprayed coatings.

In the case of a plastic optical lens L the coating material 17 is preferably a modified vinyl to constitute, in addition to protection and sealing of the convex side 1, a heat shield to protect the plastic lens L from the blocking alloy 22 when cast against the coated side of the lens L. Alternatively, the method constituting the present invention may be performed twice in connection with a plastic lens L, first with a colorless transparent modified vinyl which constitutes the heat shield to protect the lens L from the heating effect due to casting of fusible alloy 22 onto the subsequently applied vinyl copolymer film.

It is to be understood that the present method involving the spinning of an optical lens L for forming a smooth uniform film free of pinholes, sags and runs may be applied to the coating of the concave side 2 of a lens L rather than the convex side 1 as herein described. Likewise, instead of providing a readily peelable film 20 on the lens L, the film may be one which may be washed off, for example, polyvinyl acetate in an alcohol solvent capable of being removed ultrasonically in an aqueous solution.

In summary, the present method is fool-proof and consistently uniform results are obtained while eliminating the problems encountered with presently used brushing and spraying procedures. The present method produces a smooth film 20 which is free of runs and sags and pinholes and has the prescribed film thickness that is virtually uniform. Moreover, a much quicker deposit of the film 20 and much faster air drying is realized, i.e. within seconds to handle or to apply a second overcoat instead of minutes required in the brushing and spraying procedures. Moreover, there is no waste of the coating material 17 by overspray or by extra brushed-on thickness and the uniform thickness film 20 is consistently easy to peel from the lens L after deblocking than if the same coating materials were applied by either brush or spray.

In the case of mass-production technique, a series of suction cups 3 may be provided connected to vacuum lines from a vacuum pump to simultaneously pick up, dip, spin, invert, and release lenses L on drying racks which support the released lenses L with their coated convex side 1 facing upwardly.

The embodiments of the invention in which an exclusive property or privilege is claimed are defined as follows:

1. The method of coating the convex side of an optical lens for blocking and for grinding and polishing the concave side which comprises dipping the convex side in solvent-containing liquid coating material in a can while the lens is held by a suction cup coaxially on the upwardly facing concave side; moving the suction cup upwardly to withdraw the convex side and adhering coating material above the level of the coating material; rotating the suction cup about its vertically disposed axis to spin the lens about its vertically disposed axis to centrifugally spread out said coating material as a continuous film covering said downwardly facing convex side and to centrifugally spin-off excess coating material from the periphery of said convex side against the inside of the can for reuse while forming a thickened bead-like peripheral portion at the periphery of said convex side which, after de-blocking of the lens, facilitates peeling of the film in one piece from said convex side; and upwardly withdrawing the suction cup and lens from the can while continuing the spinning of said lens at least until the film of coating material on said convex side has dried sufficiently for handling.

2. The method of claim 1 wherein the lens is held on its concave side by a suction cup having a motor-driven stem by which the lens is positioned for dipping and withdrawal and by which the lens is spun upon energization of said motor.

3. The method of claim 2 wherein vibrations are dampened by the elongated laterally flexible stem of said suction cup in the event of eccentric disposition of the axis of said lens with respect to the axis of said stem and suction cup.

4. The method of coating the convex side of an optical lens for blocking and for grinding and polishing the concave side which comprises dipping the convex side in solvent-containing liquid coating material in a can while the lens is held by a suction cup coaxially on the upwardly facing concave side; moving the suction cup upwardly to withdraw the convex side and adhering coating material above the level of the coating material; rotating the suction cup about its vertically disposed axis to spin the lens about its vertically disposed axis to centrifugally spread out said coating material as a continuous film covering said downwardly facing convex side and to centrifugally spin-off excess coating material from the periphery of said convex side against the inside of the can for reuse while forming a thickened bead-like peripheral portion at the periphery of said convex side which, after de-blocking of the lens, facilitates peeling of the film in one piece from said convex side; and upwardly withdrawing the suction cup and lens from the can while continuing the spinning of said lens at least until the film of coating material on said convex side has partly dried.

5. The method of claim 4 wherein the continuing of the spinning of the lens is conducted with the lens completely withdrawn from the can and until the film has dried sufficiently for handling.

6. The method of claim 4 wherein said suction cup has a motor-driven stem by which the lens is positioned for dipping and withdrawal and by which the lens is spun upon energization of said motor, a releasable vacuum source being communicated with said suction cup to hold said lens by vacuum for dipping, withdrawal, and spinning and to release said suction cup from the lens for placement of said lens on a support with said coated convex side facing upwardly.

7. The method of claim 6 wherein vibrations are dampened by the elongated laterally flexible stem of said suction cup in the event of eccentric disposition of the axis of said lens with respect to the axis of said stem and suction cup.

8. The method of claim 6 wherein said vacuum source comprises a flexible squeeze bulb around said stem, the interior space of said bulb being communicated with the interior space between said concave side and said suction cup by way of passages in said stem and suction cup.

* * * * *